Feb. 13, 1923.
W. J. SHACKELTON.
VARIABLE INDUCTANCE ELEMENT.
FILED DEC. 24, 1920.
1,445,242.
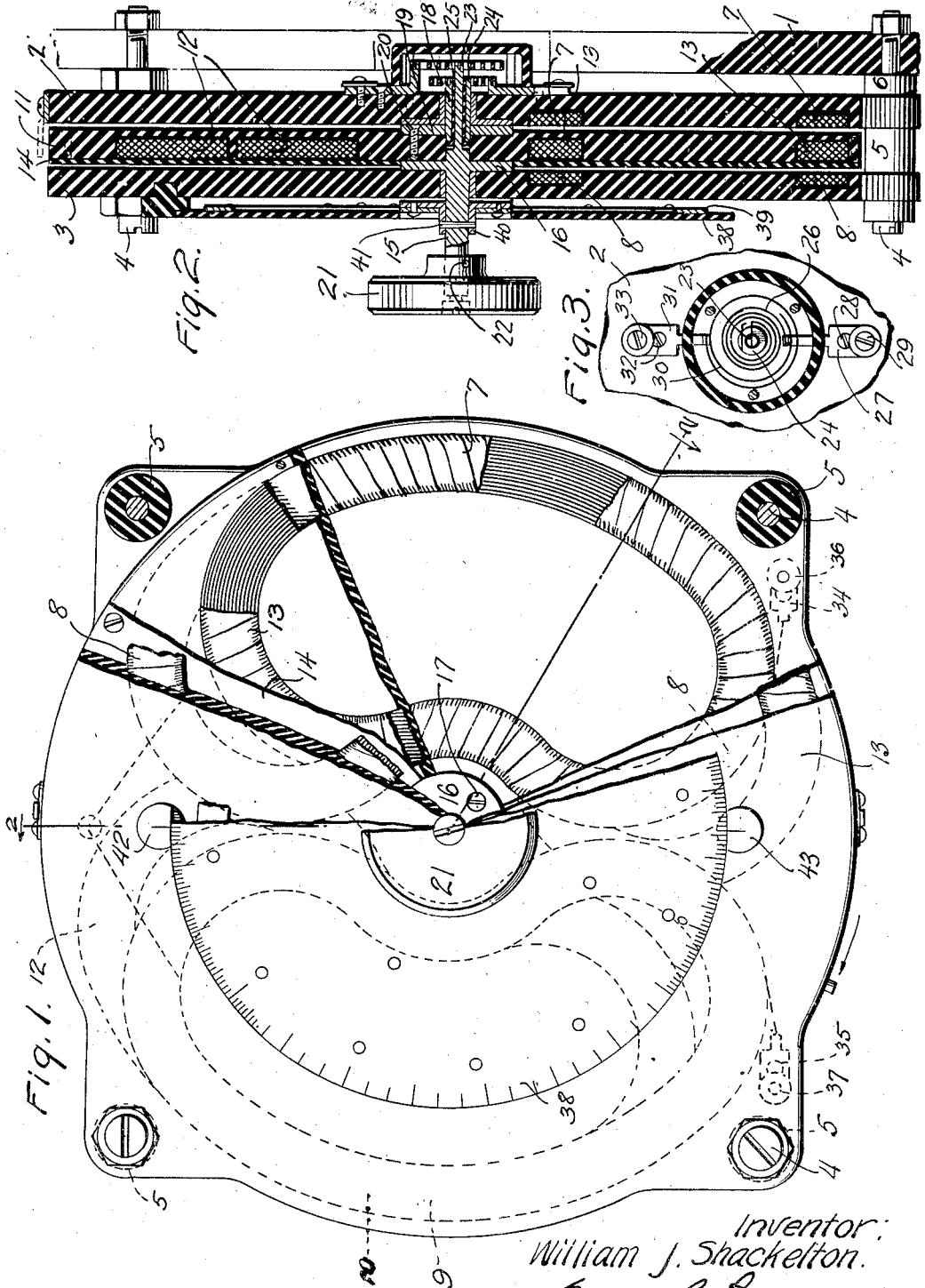
Inventor:
William J. Shackelton.
by Joel C. R. Palmer
Att'y.

Patented Feb. 13, 1923.

1,445,242

UNITED STATES PATENT OFFICE.

WILLIAM J. SHACKELTON, OF SCOTCH PLAINS, NEW JERSEY, ASSIGNOR TO WESTERN ELECTRIC COMPANY, INCORPORATED, OF NEW YORK, N. Y., A CORPORATION OF NEW YORK.

VARIABLE INDUCTANCE ELEMENT.

Application filed December 24, 1920. Serial No. 432,995.

*To all whom it may concern:*

Be it known that I, WILLIAM J. SHACKELTON, a citizen of the United States, residing at Scotch Plains, in the county of Union, State of New Jersey, have invented certain new and useful Improvements in Variable Inductance Elements, of which the following is a full, clear, concise, and exact description.

This invention relates to variable electrical elements such as are used in determining unknown inductance methods of comparison.

A well known type of inductometer employs three parallel discs placed closely face to face, each disc having embedded in it a pair of coils symmetrically placed about a common axis. The two outer discs are fixed with the corresponding coils positioned one directly over the other. The inner disc is rotatable about the axis of the coil arrangement. The inductance of the instrument depends upon the position of the moving coils with respect to the stationary coils. The coils of this instrument, as constructed hitherto, have been circular or elliptical in outline and occupy a comparatively small amount of the surface of the discs. When coils of a circular form are used the graduations of the indicating scale are not uniform, and this fact renders the calibration of the instrument difficult.

It is the object of this invention to provide an improved instrument of this type which is compact, producible in any size with uniform scale and which has a comparatively large inductance range.

In the invention in its preferred form this is accomplished by providing the discs with reniform coils, i. e., coils having an outline somewhat in the form of a kidney bean. With this form of coil substantially all of the area of each disc is included within the coils imbedded in that disc. The kidney bean form of coil is adopted since that form is the most practical to manufacture as compared with other forms which might be used to include as great a proportional disc area, and because it gives a uniform scale. One great advantage of this form is that the discs are of much smaller diameter for the same inductance value than would be used for the form of coil ordinarily employed. Another advantage is the fact that the change in inductance is substantially directly proportional to the angle through which the moving disc is turned, since for a considerable length, the periphery of the coils is concentric with the center of rotation of the moving disc. This feature assists materially in the accuracy with which the instrument may be calibrated as well as the accuracy with which the inductance values may be determined.

Other objects and advantages of the invention will appear from the further detailed description.

The drawing illustrates the invention in its preferred form and includes, Fig. 1, a plan view of the apparatus with portions cut away to show the various coils in position, Fig. 2, a cross-sectional view along the line 2—2; and Fig. 3, a view of the bearing of the movable disc showing the electric connections for the coils of that disc.

On a suitable base or table 1 are mounted two parallel discs 2 and 3 by means of the bolts 4. Discs 2 and 3 are preferably composed of an insulating compound such as hard rubber, phenol condensation product, or the like. They are spaced from each other by means of spacing washers 5, and from the base by washer 6.

In the opposing faces of each of the discs 2 and 3 are cut a pair of grooves substantially in the outline of a kidney bean. Each of these grooves substantially encloses one half the area of the disc. They are symmetrical about the center of the disc. In these grooves are imbedded coils of wire 7, 8, 9 and 10 with their opposing sides lying flush with the inner surfaces of the discs in which they lie.

Located midway between and parallel to the discs 2 and 3 is a third disc 11 of the same type of material and circular in form. Disc 11 is grooved in a manner entirely similar to discs 2 and 3. In these grooves are imbedded coils 12 and 13. A plate 14 is then fitted over the open face of the disc 11. Plate 14 is of proper thickness to bring the coils 12 and 13 substantially in the center of the assembled disc.

Disc 11 is provided with a pivot assembly located at the axis of symmetry of the coils 7 and 10, 8 and 9, and 12 and 13. This pivot assembly comprises a shaft 15 with a flange 16 fastened to disc 11 by screws 17; a bearing member 18 suitably supported in the lower disc 2; and a lower bearing plate 19 secured to the lower side of the disc 11 by means of screws 20, and adapted to rotate bearing against the bearing member 18. To rotate the disc manually a suitable knob or handle 21 is provided fastened to the shaft 15 by means of pin 22. The lower end of shaft 15 consists of the reduced shank 23 and a metal collar 24 fitting around and insulated therefrom by an insulating collar 25. The coils 12 and 13 are joined in series preferably. One end of the circuit is connected with the reduced shank 23, and the other to the collar 24. A spiral spring 26 connects the shank 23 with the terminal lug 27 supported on the bottom of disc 2 by a screw 28. A binding post 29 furnishes a suitable means to connect the lug 27 with external circuit wiring. Similarly a spiral spring 30 connects the metal collar 24 with the lug 31 supported on the bottom of the disc 2 by means of screw 32. A binding post 33 is also provided on the lug 31.

The coils 7 and 10, and 8 and 9 terminate in suitable lugs 34 and 35 attached to suitable binding posts 36 and 37 respectively, provided for connection with the external circuit.

The various pairs of coils may be interconnected in any suitable manner, depending upon the range of inductance values desired. The inventor prefers the use of a switch (not shown) which is connected with the ends of the coils so that they may be connected either in parallel or series by throwing the switch from one position to another.

The coils of the instruments are connected in such a manner as to produce a minimum inductance when corresponding coils of the three discs coincide. When the moving disc is rotated 180 degrees from this position, a point of maximum inductance is reached. Due to the even distribution of the magnetic field of the coils distributed over the effective area of the discs, the variation of inductance is substantially uniform throughout the rotation of 180 degrees.

The form of coil employed is the closest practicable approximation to enclose the disc areas. After winding, a coil cannot be shaped to sharp bends without danger of ruining the insulation or kinking the wire. The form here described has been found to be the most generally efficient and most satisfactory.

The inductance values of the instrument are calibrated on a circular plate 38 reinforced by a stiff supporting plate member 39 to which it is riveted. Member 39 is fastened to a flanged collar 40 pinned to the shaft 15 by means of pin 41. The circular plate 38 is provided with two scales of calibrations each occupying an arc of 180 degrees on the circumference. One scale represents the values of inductance when the coils are connected in series, and the other, when connected in parallel. Indices are provided for the scales in the form of pegs 42 and 43 each having a line indented thereon to indicate the position of minimum inductance for the instrument.

While the invention has been described with only one movable disc and two fixed discs, any convenient number of discs may be employed mounted in the same assembly and such is contemplated in this invention.

What is claimed is:

1. An inductometer comprising a pair of parallel fixed discs, a rotatable disc centrally positioned between the fixed discs, and a pair of reniform coils similarly located in each of the fixed discs and the movable disc.

2. An inductometer comprising a pair of parallel fixed discs and a rotatable disc centrally positioned between the fixed discs, and a pair of reniform coils for each of the fixed discs and the rotatable disc, the coils being symmetrically positioned about the center of rotation of the rotatable disc, and similarly located in the fixed disc.

3. An inductometer comprising two pairs of reniform coils each pair being symmetrically positioned about an axis to substantially enclose the area of an enveloping circle, a third pair of coils of form and arrangement similar to the first two pairs of coils, centrally positioned therebetween, and means to rotate the third pair of coils about its axis, and relatively to the first two pairs of coils.

4. In an inductometer, a plurality of parallel fixed discs, a movable disc positioned between said fixed discs and rotatable about a common central axis, and a pair of coils for each of said discs, each coil enclosing substantially one half the area of its disc and having substantial portions of its length arcuate about the axis of rotation of the movable disc.

In witness whereof, I hereunto subscribe my name this 20th day of December, A. D. 1920.

WILLIAM J. SHACKELTON.